United States Patent Office 2,984,665
Patented May 16, 1961

---

2,984,665
CONDENSED HETEROCYCLIC COMPOUNDS

Newman M. Bortnick, Oreland, and Marian F. Fegley, Mont Clare, Pa., assignors to Rohm & Haas Company, Philadelphia, Pa., a corporation of Delaware No Drawing. Filed May 14, 1958, Ser. No. 735,140

20 Claims. (Cl. 260—251)

This invention deals with specific condensed heterocyclic compounds as new compositions of matter. It also deals with a method for the preparation of these specific condensed heterocyclic compounds.

The compounds of this invention are prepared by reacting a specific heterocyclic compound with a compound having the formula $R_5AH$ in a substantially equimolecular ratio, to be more fully explained hereinafter. The heterocyclic reactants used may be represented by the formula

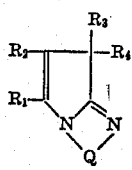

The products of this invention may be represented by the formula

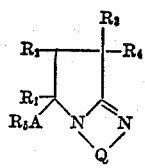

The symbol $R_1$ represents hydrocarbon groups of one to ten carbon atoms, preferably alkyl, aralkyl, cycloalkyl, aryl, and alkaryl. The symbol $R_2$ represents a hydrogen atom or an alkyl group of one to four carbon atoms. The symbols $R_3$ and $R_4$ may be hydrogen atoms or hydrocarbon groups containing from one to ten carbon atoms including alkyl, aralkyl, cycloalkyl, aryl, and alkaryl groups. In addition, $R_1$ and $R_2$ taken together with the carbon atoms to which they are joined may form a carbocyclic ring containing five to six carbon atoms which in turn may have alkyl substituents containing a total of no more than four additional carbon atoms. In addition, $R_2$ and $R_3$ taken together with the carbon atoms to which they are joined may form a carbocyclic ring containing five to six carbon atoms which in turn may have alkyl substituents containing a total of no more than four additional carbon atoms. In addition, $R_3$ and $R_4$ when taken together with the carbon atom to which they are joined may form a carbocyclic ring containing five to six carbon atoms which in turn may have alkyl substituents containing a total of no more than four additional carbon atoms. The total number of carbon atoms in the groups $R_1$, $R_2$, $R_3$, and $R_4$ should not exceed 20. The preferred embodiments are those in which $R_1$ and $R_4$ are alkyl groups, $R_2$ is a hydrogen atom, and $R_3$ is a methyl group. $R_1$, $R_3$, and $R_4$ may typically individually represent methyl, butyl, octyl, benzyl, phenylbutyl, cyclopentyl, cyclohexyl, phenyl, naphthyl, butylphenyl groups, and the like.

The symbol Q represents a chain of two to three carbon atoms between the two nitrogen atoms to which it is joined. Q may be a straight chain alkylene group, an alkyl-substituted alkylene group, or a cycloalkyl, aryl, or aralkyl group as long as there are no more than two to three carbon atoms between the two primary amino groups. While the upper limit of carbon atoms in Q is not especially critical, about 18 is considered the practical upper limit. Also, while the group Q may contain alkyl substituents, it is necessary that the carbon atom directly attached to the ring nitrogen atom be attached to no more than two carbon atoms.

Typical representations of the Q group include

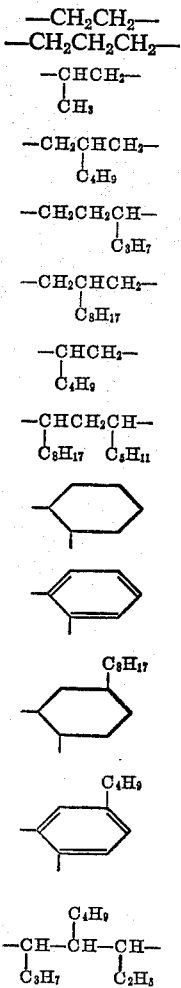

and

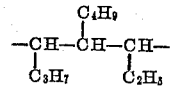

The symbol A represents a chalcogen having an atomic weight of 16 to 32; that is, oxygen or sulfur. The —AH group in the reactant $R_5AH$ must be attached to a hydrogen atom or a carbon atom that is in turn attached to no more than two other carbon atoms. Otherwise, the present reaction is sterically hindered and not readily consummated.

The symbol $R_5$ represents a hydrogen atom, an alkyl group of one to twelve carbon atoms, an alkenyl group of three to twelve carbon atoms, an aryl group of up to ten carbon atoms, an aralkyl group of up to twelve carbon atoms, an alkarylalkyl group of up to twelve carbon atoms, an alkoxyalkyl group of three to twelve carbon atoms, a hydroxyalkyl group of up to twelve carbon atoms, an alkylaminoalkyl group of three to eighteen carbon atoms, provided that the amino group is a secondary or tertiary structure that is non-primary. Alkyl, in the above definition is to be construed to include cycloalkyl and alkylcycloalkyl within the range of carbon atoms previously set forth.

Illustrative heterocyclic reactants include 2,3-dihydro- 5,7,7-trimethyl-(7H)-imidazo[1,2-a]pyrrole, 2,3-dihydro-5,6-dimethyl-(7H)-imidazo[1,2-a]pyrrole, 2,3-dihydro-5,7-dimethyl-7-hexyl-(7H)-imidazo[1,2-a]pyrrole, 7-methyl-5,7-bis(2-methylpropyl)-2,3-dihydro-(7H)-imidazo[1,2-a]pyrrole, 2,3-dihydro-5,7-dimethyl-7-(2,2-dimethylpropyl)-(7H)-imidazo[1,2-a]pyrrole, 2,3-dihydro-2(or 3),5,5,7-tetramethyl-(7H)-imidazo[1,2-a]pyrrole, 2(or 3),7-dimethyl-5,7-diphenyl-2,3-dihydro-(7H)-imidazo[1,2-a]pyrrole, 2(or 3),5-dimethyl-2,3,7,8,9,9a-hexahydro-(6H)-isoindolo[1,2-a]imidazole, spiro{3,3-dimethylbicyclo(2.2.1)-heptane-2,7'[2'(or 3'),5-dimethyl-2',3'-dihydro-(7'H)-imidazo[1,2-a]pyrrole}, 2(or 3),6,9,9-tetramethyl-2,3,5,6,7,8-hexahydro-(9H)-indolo[1,2-a]imidazole, 6,8,8-trimethyl-2,3,4,8-tetrahydropyrrolo[1,2-a]pyrimidine, spiro{cyclohexane-1,10'[2',3',4',6',7',8',9',10'-octahydroindolo-[1,2-a]pyrimidine]}, 6-methyl-2,3,4,7,8,9,10,10a-octahydroisoindolo[1,2-a]pyrimidine, 6,8-dimethyl-8-(2,2-dimethylpropyl)-2,3,4,8-tetrahydropyrrolo[1,2-a]pyrimidine and 1,3,3-trimethyl-(3H)-pyrrolo[1,2-a]benzimidazole. These heterocyclic reactants may be prepared by the method disclosed in our copending application Serial No. 718,504, filed March 3, 1958.

Typical $R_5AH$ reactants are water, methanol, ethanol, propanol, 2-methylpropanol, 2,2-dimethylpropanol, 1-butanol, 2-ethylhexanol, 1-octanol, 1-dodecanol, 1-octadecanol, benzyl alcohol, β-phenylethanol, 3-dimethylamino-1-propanol, 2-dibutylaminoethanol, 3-butylaminopropanol, 2-methoxyethanol, 2-butoxyethanol, 2-methoxy-1-propanol, cyclohexanol, furfuryl alcohol, tetrahydrofurfuryl alcohol, tetrahydrobenzyl alcohol, 2-norcamphanylmethanol, 2-norcamphenylmethanol, 2-phenoxyethanol, 2-methylmercaptoethanol, 2-butylmercaptoethanol, 2-vinoxyethanol, 2-vinylmercaptoethanol, allyl alcohol, crotyl alcohol, α-naphthylmethanol, β-naphthylmethanol, hydrogen sulfide, methyl mercaptan, butyl mercaptan, cyclohexyl mercaptan, phenyl mercaptan, benzyl mercaptan, 2-methoxyethyl mercaptan, 2-ethoxyethyl mercaptan, 2-butoxyethyl mercaptan, 2-phenoxyethyl mercaptan, dodecyl mercaptan, hexadecyl mercaptan, octadecyl mercaptan, 2-methoxypropyl mercaptan, 2-butoxypropyl mercaptan, 2-butoxybutyl mercaptan, 2-butoxycyclohexyl mercaptan, β-phenylethyl mercaptan, γ-phenylbutyl mercaptan, benzylmercaptoethyl mercaptan, phenylmercaptoethyl mercaptan, methyl thioglycolate, ethyl thioglycolate, butyl thioglycolate, octyl thioglycolate, octadecyl thioglycolate, methyl β-mercaptopropionate, β-mercaptopropionitrile, ethylene glycol, diethylene glycol, propylene glycol, trimethylene glycol, tetramethylene glycol, 2-ethylhexanediol-1,3-ethanedithiol, 1,2-propanedithiol, 1,3-propanedithiol, 1,2-butanedithiol, 1,3-butanedithiol, 1,4-butanedithiol, butenediol, butynediol, and the like.

The present compounds are prepared by reacting an equivalent of the defined heterocyclic reactant with substantially an equivalent of the defined $R_5AH$ reactant. Generally, it is preferred to employ the $R_5AH$ reactant in excess of the amount required in order to assure completeness of reaction and maximum yields. The reaction temperature ranges from normal room temperature (about 20° C.) to about 75° C., preferably about 20° to 60° C. The reaction is readily conducted without the use of a solvent but if such is desired, there may be employed an inert volatile organic solvent such as benzene, toluene, xylene, heptane, hexane, methylene chloride, chloroform, and the like. While no catalyst is necessary, it is frequently advantageous to employ an acidic catalyst in order to accelerate the reaction. In this respect, there may be employed organic or inorganic acids, such as hydrochloric, phosphoric, sulfuric, oxalic, fumaric, or the like; amine salts, such as aniline hydrochloride, pyridine hydrochloride, and the like; or cation exchange resins, such as conventional carboxylic and sulfuric acid types. The products formed are either crystalline solids or viscous liquids. The products do not require any purification, although distillation under reduced pressure or recrystallization from a solvent such as octane may be employed if a product of high purity is desired.

The products of this invention are useful as fungicides particularly when applied against Monilinia fructicola and Stemphylium sarcinaeforme when tested and evaluated according to standard methods. These compounds consistently exhibit 100% control against the above fungi in concentrations frequently no greater than 0.0005 to 0.005%. Particularly effective in this respect are 5 - dodecylthio - 5,7,7-trimethyl-2,3,5,6-tetrahydro-(7H)-imidazo[1,2-a]pyrrole and 1,2-bis-[5-(2,3,5,6-tetrahydro-5,7,7 - trimethyl - (7H) - imidazo[1,2-a]pyrrolyl) - thio]-ethane.

The products of this invention are also useful as hypotensive agents that do not exhibit any substantially untoward side effects. In such cases, the products are usually employed in their physiologically acceptable acid addition salt form.

The compounds of this invention have been presented in their free-base form and in this free-base form, they possess the valuable characteristics and concurrent utilities previously referred to. However, it is to be construed that the present invention includes the acid addition salts of these free-base products also. It is desirable, in some instances, to employ the present products in their water-soluble salt form. For instance, in pesticidal applications, it is highly desirable to deal with water-soluble compounds in order that satisfactory spray solutions may be formulated. In other applications, wherein any physiological benefits are desired, it is frequently advantageous to employ the present products in their physiologically acceptable organic salt form in order to provide the stability and physiological tolerance required.

In order to prepare the salt forms of the present compounds, it is necessary only to react these compounds with a stoichiometric amount of the selected acid. The salt formation occurs readily at room temperature without the aid of a catalyst. If solid reactants are employed, it may be advantageous to use an inert volatile solvent such as benzene, toluene, xylene, hexane, heptane, methylene chloride, chloroform, or the like. The solvent can then be readily removed at the conclusion of the reaction by conventional methods. The salt product does not require any further purification although recrystallization from a solvent such as isooctane may be resorted to if a product of high purity is demanded.

While it is believed clear to one skilled in the art from the above description how the salts are prepared, such salt formation may be specifically illustrated by indicating that one takes an equivalent amount of a selected compound of this invention in its free-base form, and then adds a stoichiometric amount of a selected acid which would for instance be 36.5 parts of hydrochloric acid, 98 parts of sulfuric acid, 60 parts of acetic acid, 72 parts of acrylic acid, and the like. The corresponding hydrochloric, sulfuric, acetic, and acrylic acid salts respectively are readily formed. Similarly, other salt products may be prepared.

Typical organic and inorganic acids that may be employed are formic acid, acetic acid, propionic acid, butyric acid, caproic acid, capric acid, lauric acid, myristic acid, palmitic acid, stearic acid, acrylic acid, methacrylic acid, crotonic acid, undecylenic acid, oleic acid, linoleic acid, linolenic acid, ricinoleic acid, propiolic acid, butynoic acid, cyclobutanecarboxylic acid, norcamphane - 2 - carboxylic acid, benzoic acid, resorcylic acid, oxalic acid, succinic acid, glutaric acid, adipic acid, sebacic acid, salicylic acid, maleic acid, fumaric acid, glutaconic acid, saccharic acid, dodecanedioic acid, octendioic acid, cyclohexaneacetic acid, cyclopentaneacetic acid, tridecanoic acid, hexynedioic acid, phthalic acid, cinnamic acid, benzenesulfonic acid, ethanesulfonic acid, naphthalenesulfonic acid, toluenesulfinic acid, glutamic acid, glyoxalic acid, phenylglyoxalic acid, pyruvic acid, levulinic acid, glycine, amino-caproic acid, hydrochloric acid, hydrobromic acid, sulfuric acid, perchloric acid, carbonic acid, nitric acid, and phosphoric acid.

The compounds of this invention, as well as the method for their preparation, may be more fully understood from the following examples which are offered by way of illustration and not by way of limitation. Parts by weight are used throughout.

Example 1

Water (18 parts) is stirred with 2,3-dihydro-5,7,7-trimethyl-(7H)-imidazo[1,2-a]pyrrole (25 parts) for six hours at room temperature. After standing overnight, the reaction mixture becomes a crystalline magma. Recrystallization from acetone gives a crude product having a melting point of 99°–106° C. and a neutral equivalent of 170. A second recrystallization gives the analytical sample having a melting point of 108°–109° C. This sample contains 16.36% nitrogen (16.65% theoretical for $C_9H_{16}N_2O$). The yield is nearly quantitative.

This hydration reaction is extremely rapid and is acid-catalyzed.

2,3 - Dihydro - 5,7,7 - trimethyl - (7H) - imidazo[1,2-a]pyrrole shows a single large peak in the ultraviolet region at 244 mμ with a molar extinction coefficient of above 15,000 (16,900 in isooctane solution). In water solution this peak disappears completely within 3.5 hours and a new peak at 220 mμ with a molar extinction coefficient of 6400 replaces it. This latter peak is characteristic of 2,3,5,6-tetrahydro-(7H)-imidazo[1,2-a]pyrroles.

When salts of 2,3-dihydro-5,7,7-trimethyl-(7H)-imidazo[1,2-a]pyrrole are prepared in non-hydroxylic media, such as ether and the like, and then are dissolved in water, extremely rapid hydration to the corresponding salt of 5-hydroxy - 5,7,7 - trimethyl - 2,3,5,6 - tetrahydro - (7H)-imidazo[1,2-a]pyrrole occurs, indeed, so fast that the 244 mμ peak is not observed at all even when the aqueous solutions are examined immediately upon mixing.

In a similar fashion, 2,3-dihydro-5,7-dimethyl-7-(2,2-dimethylpropyl)-(7H)-imidazo[1,2-a]pyrrole gives a 5-hydroxy - 2,3,5,6 - tetrahydro - 5,7 - dimethyl - 7 - (2,2-dimethylpropyl)-(7H)-imidazo[1,2-a]pyrrole; 2(or 3),7-dimethyl - 5,7 - diphenyl - 2,3 - dihydro - (7H) - imidazo-[1,2-a]pyrrole gives 5-hydroxy-2(or 3),7-dimethyl-5,7-diphenyl - 2,3,5,6 - tetrahydro - (7H) - imidazo[1,2-a]-pyrrole; and spiro {[3,3-dimethylbicyclo(2.2.1)heptane]-2,7' - [2'(or 3') - methyl - 2',3' - dihydro - (7'H) - imidazo[1,2-a]pyrrole]} gives spiro {[3,3-dimethylbicyclo-(2.2.1)heptane] - 2,7' - [2'(or 3') - methyl - 5' - hydroxy - 2',3',5',6' - tetrahydro - (7'H) - imidazo[1,2-a]-pyrrole]}.

Example 2

Methanol (15 parts), 2,3-dihydro-5,7,7-trimethyl-(7H)-imidazo[1,2-a]pyrrole (30 parts) and pyridine hydrochloride (0.6 part) are combined and refluxed with stirring for 22 hours. The excess methanol is removed by stripping the reaction mixture until the temperature in the pot rises to 50° C. under a pressure of 20 mm. The residue (38 parts) has an $n_D^{25}$ value of 1.4861. The product contains 15.10% nitrogen (15.37% theoretical for $C_{10}H_{18}N_2O$).

The addition of methanol to 2,3-dihydro-5,7,7-trimethyl-(7H)-imidazo[1,2-a]pyrrole is much slower than the addition of water described above. Here again, observation of the ultraviolet absorption spectra of solutions allows one to follow the rate of conversion of the 2,3-dihydro to the 2,3,5,6-tetrahydro structure. When a mixture of methanol and the starting material is allowed to stand in the absence of an acid catalyst, after 3.5 hours 25% reaction has occurred at room temperature whereas virtually complete reaction was observed in the case of water. When equimolar mixtures of fumaric acid and 2,3 - dihydro - 5,7,7 - trimethyl - (7H) - imidazo[1,2-a]-pyrrole in methanol solution are examined in the ultraviolet region, the extinction coefficient drops to less than 40% of its initial value only 37 minutes after mixing at room temperature at which point the peak has degenerated to a shoulder. Thus the acid definitely catalyzes the addition of methanol to the imidazopyrrole.

In the manner of the above example, 5-ethoxy-7-methyl - 5,7 - bis - (2-methylpropyl) - 2,3,5,6 - tetrahydro-(7H)-imidazo[1,2-a]pyrrole is prepared from ethanol and 7 - methyl - 5,7 - bis - (2 - methylpropyl) - 2,3 - dihydro - (7H) - imidazo[1,2 - a]pyrrole; 5 - [2 - ethylhexoxy) - 2,3,5,6 - tetrahydro - 2(or 3),5,7,7-tetramethyl-(7H)-imidazo[1,2-a]-pyrrole is obtained from 2-ethylhexanol and 2,3-dihydro-2(or 3), 5,7,7-tetramethyl-(7H)-imidazo[1,2-a]pyrrole; 6-benzyloxy-6-methyl-2,3,4,6,6a,7,8,9,10,10a-decahydroisoindolo[1,2-a]pyrimidine is prepared from benzyl alcohol and 6-methyl-2,3,4,7,8,9,10,10a-octahydroisoindolo[1,2-a]pyrimidine; and 1,2-dihydro - 1 - methoxy - 1,3,3 - trimethyl - (3H) - pyrrolo[1,2-a]benzimidazole is prepared from methanol and 1,3,3-trimethyl-(3H)-pyrrolo[1,2-a]benzimidazole.

Example 3

To a saturated solution of fumaric acid in ethanol is added 2,3-dihydro-5,7,7-trimethylimidazo[1,2-a]pyrrole in the ratio of 150 parts of the latter to 116 parts of fumaric acid under reflux conditions. The mixture is cooled and filtered. Secondary crops of crystals are collected upon evaporation of the mother liquor. The combined yield of 5-ethoxy-5,7,7-trimethyl-2,3,5,6-tetrahydro-(7H)-imidazo[1,2-a]pyrrole is 97% of the theoretical.

In a similar fashion are prepared the citrate, the stearate, the monohydrogen succinate and the oxalate of 5-ethoxy - 5,7,7 - trimethyl - 2,3,5,6 - tetrahydro - (7H)-imidazopyrrole and the picrate, the crotonate, the acetate and the p-toluenesulfonate of 5-methoxy-5,7,7-trimethyl-2,3,5,6-tetrahydro-(7H)-imidazo[1,2-a]pyrrole.

Example 4

Liquid hydrogen sulfide (57 parts) and chloroform (25 parts) are added to a reactor which had been cooled in a Dry Ice-acetone bath. 2,3-dihydro-5,7,7-trimethyl-(7H)-imidazo[1,2-a]-pyrrole (32 parts) is added dropwise with stirring while the pot temperature is maintained below 0° C. Gaseous hydrogen sulfide is swept through the reactor during the addition and in a subsequent reaction period of six hours at room temperature. Chloroform and excess hydrogen sulfide are stripped from the reaction mixture under reduced pressure. The final pot temperature is 70° C. at 0.6 mm. absolute pressure. The product is obtained as a sticky glass and contains 15.20% nitrogen (15.20% theoretical for $C_9H_{16}N_2S$) and 16.30% sulfur (17.40% theoretical for $C_9H_{16}N_2S$). The yield is nearly quantitative.

In a similar fashion, hydrogen sulfide is added to 2,3-dihydro - 5,7 - dimethyl - 7 - hexyl - (7H) - imidazo[1,2-a]pyrrole to give 5-mercapto-5,7-dimethyl-7-hexyl-2,3,5,6-tetrahydro-(7H)-imidazo[1,2-a]pyrrole; to 2(or 3),5-dimethyl - 2,3,7,8,9,9a - hexahydro - (6H) - isoindolo[1,2-a]imidazole to give 5-mercapto-2(or 3),5-dimethyl-2,3,5,5a,7,8,9,9a - octahydro - (6H) - isoindolo[1,2 - a]imidazole; and to 6,8,8-trimethyl-2,3,4,8-tetrahydropyrrolo-[1,2-a]pyrimidine to give 6-mercapto-6,8,8-trimethyl-2,3,4,6,7,8-hexahydropyrrolo[1,2-a]pyrimidine.

Example 5

Decyl mercaptan (17.8 parts) and 2,3-dihydro-5,7,7-trimethyl-(7H)-imidazo[1,2-a]pyrrole (15 parts) are combined and allowed to stand in a stoppered flask for 9 days. Examination of the infrared spectrum of the reaction mixture shows no absorption in the SH region. Traces of the starting material, 2,3-dihydro-5,7,7-trimethyl-(7H)-imidazo[1,2-a]pyrrole are distinguishable. The conversion to the desired product, 5-decylthio-2,3,5,6-tetrahydro-5,7,7-trimethyl-(7H)-imidazo[1,2-a]pyrrole, is nearly quantitative.

Example 6

Dodecyl mercaptan (43 parts) and 2,3-dihydro-5,7,7-trimethyl-(7H)-imidazo[1,2-a]pyrrole (33 parts) are combined with sulfuric acid (0.1 part). The reaction mixture is heated at 60° C. overnight. The mixture is then stripped under reduced pressure to a pot temperature of 124° C. at 0.2 mm. absolute pressure and a final vapor temperature of 80° C. at 0.2 mm. absolute pressure. That the prolonged reaction period is unnecessary is shown by the observation that the distillate (32.3 parts) has an $n_D^{23}$ value of 1.4821, a neutral equivalent of 339, and contains 7.7% nitrogen (7.9% theoretical for $C_{21}H_{40}N_2S$) and 8.7% sulfur (9.1% theoretical for $C_{21}H_{40}N_2S$). This indicates that the reaction is a reversible one and that the stripping temperature favors the reactants, not the product. As the reactants are stripped off and then collected, they combine to form the product, 5 - dodecylthio - 2,3,5,6 - tetrahydro - 5,7,7 - trimethyl-(7H)-imidazo[1,2-a]pyrrole. Infrared examination of both this distillate product and the residue shows the absence of SH. The residue (37 parts) has an $n_D^{24}$ value of 1.4908 and a neutral equivalent of 454.5. It contains 6.5% nitrogen and 9.8% sulfur and is a mixture of the above product with some didodecyldisulfide.

Example 7

The procedure of Example 6 is repeated except that the temperature used is 25°–35° C. and the reaction period was 18 hours. Examination of the infrared absorption spectrum of the viscous oily product shows that no mercaptan and no 2,3-dihydroimidazopyrrole structures remain. The ultraviolet absorption spectrum again shows the absence of a peak at 244 mμ in isooctane solution.

In a similar fashion 5-benzylthio-2(or 3),5,7,7-tetramethyl-2,3,5,6-tetrahydro-(7H)-imidazo[1,2-a]pyrrole is formed from benzyl mercaptan and 2(or 3),5,7,7-tetramethyl-2,3-dihydro-(7H)-imidazo[1,2-a]pyrrole and 4a-allylthio-2(or 3),6,9,9-tetramethyl-2,3,4a,5,6,7,8,8a-octahydro-(9H)-indolo[1,2-a]imidazole is formed from allyl mercaptan and 2(or 3),6,9,9-tetramethyl-2,3,5,6,7,8-hexahydro-(9H)-indolo[1,2-a]imidazole.

Example 8

Ethanedithiol (14 parts) is added dropwise to a stirred solution of 2,3-dihydro-5,7,7-trimethyl-(7H)-imidazo[1,2-a]pyrrole hydrochloride (0.3 part) in the free base (45 parts). An exothermic reaction occurs and an ice-bath has to be used to control it. After the exothermic reaction has subsided (a 65° C. rise in temperature is observed), the material is maintained at 108° C. for two hours. The reaction mixture is then stripped under reduced pressure by means of a water aspirator then a high vacuum pump to give the product (44 parts). The product is 1,2-bis[5-(2,3,5,6-tetrahydro-5,7,7-trimethyl-(7H)-imidazo[1,2-a]pyrrolyl)thio]ethane and contains 13.8% nitrogen (14.1% theoretical) and 17.6% sulfur (16.2% theoretical). A small amount of the 1:1 addition product, 5-(2-mercaptoethylthio)-2,3,5,6-tetrahydro-5,7,7-trimethyl-(7H)-imidazo[1,2-a]pyrrole is also formed concurrently.

In a similar fashion 1,6-hexanedithiol and 2,3-dihydro-5,7,7-trimethyl-(7H)-imidazo[1,2-a]pyrrole gives 1,6-bis-[5-(2,3,5,6 - tetrahydro - 5,7,7 - trimethyl-(7H)-imidazo[1,2-a]pyrrolyl)thio]hexane and 2,2-dimethyl-1,3-propanedithiol and 6,8-dimethyl - 8 - (2,2-dimethylpropyl)-2,3,4,8-tetrahydropyrrolo[1,2-a]pyrimidine give 1,3-bis-[6-(6,8-dimethyl - 8 - (2,2 - dimethylpropyl)-2,3,4,6,7,8-hexahydropyrrolo[1,2-a]pyrimidinyl)thio] - 2,2 - dimethylpropane.

Example 9

2,3-dihydro - 5,7,7, - trimethyl-(7H)-imidazo[1,2-a]-pyrrole (30 parts) is slowly added to a stirred solution of 2-mercaptobenzothiazole (33.5 parts) in chloroform (70 parts by volume). The reaction is mildly exothermic. After standing overnight, the material is stripped at reduced pressure until the pot temperature rises to 50° C. to give a taffy-like mass which is identified as 5-(2-benzothiazolyl)thio - 2,3,5,6 - tetrahydro-5,7,7-trimethyl-(7H)-imidazo[1,2-a]pyrrole.

We claim:
1. As a composition of matter, a member from the class consisting of a compound having the formula

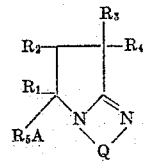

and the acid addition salts thereof, in which $R_1$ taken individually represents a member from the group consisting of alkyl, phenylalkyl, cycloalkyl, phenyl, naphthyl, and alkylphenyl of up to 10 carbon atoms, $R_2$ taken individually represents a member from the group consisting of hydrogen and alkyl of 1 to 4 carbon atoms, $R_3$ and $R_4$ taken individually represent members from the group consisting of alkyl, cycloalkyl, phenylalkyl, phenyl, naphthyl, and alkylphenyl of up to 10 carbon atoms, $R_1$ and $R_2$ taken collectively with the carbon atoms to which they are joined form a member from the group consisting of a saturated carbocyclic ring of 5 to 6 carbon atoms and said ring having alkyl substituents consisting of a total of up to 4 carbon atoms, $R_2$ and $R_3$ taken collectively with the carbon atoms to which they are joined form a member from the group consisting of a saturated carbocyclic ring of 5 to 6 carbon atoms and said ring having alkyl substituents consisting of a total of up to 4 carbon atoms, and $R_3$ and $R_4$ taken collectively with the carbon atoms to which they are joined form a member from the group consisting of a saturated carbocyclic ring of 5 to 6 carbon atoms and said ring having alkyl substituents consisting of a total of up to 4 carbon atoms, $R_5$ represents a member from the group consisting of hydrogen, alkyl of 1 to 12 carbon atoms, alkenyl of 3 to 12 carbon atoms, aryl of up to 10 carbon atoms, aralkyl of up to 12 carbon atoms, alkarylalkyl of up to 12 carbon atoms, alkoxyalkyl of 3 to 12 carbon atoms, hydroxyalkyl of up to 12 carbon atoms, and alkylaminoalkyl of 3 to 18 carbon atoms, Q contains a total of up to about 18 carbon atoms and is a member from the group consisting of

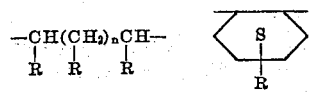 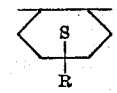

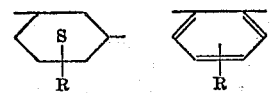

and

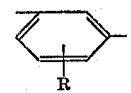

in which $n$ is a number from zero to one and R is a member of the group consisting of hydrogen and alkyl, and A is a chalcogen having an atomic weight of 16 to 32.

2. As a composition of matter, the compound having the formula

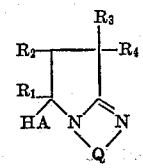

in which $R_1$ is an alkyl group of 1 to 10 carbon atoms, $R_2$ is a hydrogen atom, $R_3$ is an alkyl group of 1 to 10 carbon atoms, $R_4$ is an alkyl group of 1 to 10 carbon atoms, Q represents ethylene and A represents oxygen.

3. As a composition of matter, the compound having the formula

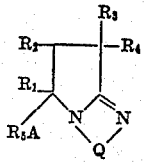

in which $R_1$ is an alkyl group of 1 to 10 carbon atoms, $R_2$ is a hydrogen atom, $R_3$ is an alkyl group of 1 to 10 carbon atoms, $R_4$ is an alkyl group of 1 to 10 carbon atoms, $R_5$ is an alkyl group of 1 to 12 carbon atoms, Q represents ethylene and A represents oxygen.

4. As a composition of matter, the compound having the formula

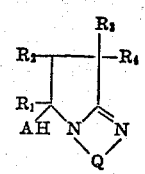

in which $R_1$ and $R_4$ are alkyl groups of 1 to 10 carbon atoms, $R_2$ is a hydrogen atom, $R_3$ is a methyl group, Q represents ethylene and A represents oxygen.

5. As a composition of matter, the compound having the formula

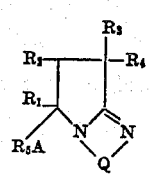

in which $R_1$ and $R_4$ are alkyl groups of 1 to 10 carbon atoms, $R_2$ is a hydrogen atom, $R_3$ is a methyl group, $R_5$ is an alkyl group of 1 to 12 carbon atoms, Q represents ethylene and A represents oxygen.

6. As a composition of matter, the compound having the formula

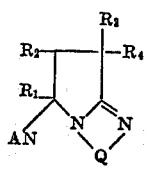

in which $R_1$ and $R_2$ taken collectively with the carbon atoms to which they are joined form a saturated carbocyclic ring containing 5 to 6 carbon atoms, $R_3$ and $R_4$ are alkyl groups of 1 to 10 carbon atoms, Q is ethylene and A is oxygen.

7. As a composition of matter, the compound having the formula

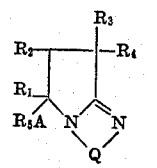

in which $R_1$ and $R_2$ taken collectively with the carbon atoms to which they are joined form a saturated carbocyclic ring containing 5 to 6 carbon atoms, $R_3$ and $R_4$ are alkyl groups of 1 to 10 carbon atoms, $R_5$ is an alkyl group of 1 to 12 carbon atoms, Q is ethylene, and A is oxygen.

8. As a composition of matter, the compound having the formula

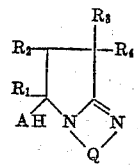

in which $R_1$ is an alkyl group of 1 to 10 carbon atoms, $R_2$ and $R_3$ taken collectively with the carbon atoms to which they are joined form a saturated carbocyclic ring containing 5 to 6 carbon atoms, $R_4$ is an alkyl group of 1 to 10 carbon atoms, Q is ethylene, and A is oxygen.

9. As a composition of matter, the compound having the formula

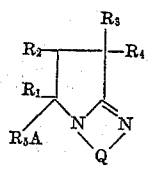

in which $R_1$ is an alkyl group of 1 to 10 carbon atoms, $R_2$ and $R_3$ taken collectively with the carbon atoms to which they are joined form a saturated carbocyclic ring containing 5 to 6 carbon atoms, $R_4$ is an alkyl group of 1 to 10 carbon atoms, $R_5$ is an alkyl group of 1 to 12 carbon atoms, Q is ethylene, and A is oxygen.

10. As a composition of matter, the compound having the formula

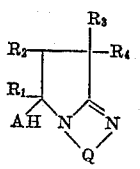

in which $R_1$ is an alkyl group of 1 to 10 carbon atoms, $R_2$ is an alkyl group of 1 to 4 carbon atoms, $R_3$ and $R_4$ taken collectively with the carbon atoms to which they are joined form a saturated carbocyclic ring containing 5 to 6 carbon atoms, Q is ethylene, and A is oxygen.

11. As a composition of matter, the compound having the formula

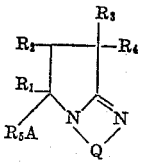

in which $R_1$ is an alkyl group of 1 to 10 carbon atoms, $R_2$ is an alkyl group of 1 to 4 carbon atoms, $R_3$ and $R_4$ taken collectively with the carbon atoms to which they are joined form a saturated carbocyclic ring containing 5 to 6 carbon atoms, $R_5$ is an alkyl group of 1 to 12 carbon atoms, Q is ethylene, and A is oxygen.

12. As a composition of matter, 5-hydroxy-2,3,5,6-tetrahydro-5,7,7-trimethyl-(7H)-imidazo[1,2-a]pyrrole.

13. As a composition of matter, 5-dodecylthio-2,3,5,6-tetrahydro-5,7,7-trimethyl-(7H)-imidazo[1,2-a]pyrrole.

14. As a composition of matter, 5-methoxy-2,3,5,6-tetrahydro-5,7,7-trimethyl-(7H)-imidazo[1,2-a]pyrrole.

15. As a composition of matter, 5-mercapto-2,3,5,6-tetrahydro-5,7,7-trimethyl-(7H)-imidazo[1,2-a]pyrrole.

16. As a composition of matter, 6-mercapto-6,8,8-trimethyl-2,3,4,6,7,8-hexahydropyrrolo[1,2-a]pyrimidine.

17. A method for the preparation of a compound having the formula

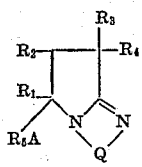

in which $R_1$ taken individually represents a member from the group consisting of alkyl, phenylalkyl, cycloalkyl, phenyl, naphthyl, and alkylphenyl of up to 10 carbon atoms, $R_2$ taken individually represents a member from the group consisting of hydrogen and alkyl of 1 to 4 carbon atoms, $R_3$ and $R_4$ taken individually represent members from the group consisting of alkyl, cycloalkyl, phenylalkyl, phenyl, naphthyl, and alkylphenyl of up to 10 carbon atoms, $R_1$ and $R_2$ taken collectively with the carbon atoms to which they are joined form a member from the group consisting of a saturated carbocyclic ring of 5 to 6 carbon atoms and said ring having alkyl substituents consisting of a total of up to 4 carbon atoms, $R_2$ and $R_3$ taken collectively with the carbon atoms to which they are joined form a member from the group consisting of a saturated carbocyclic ring of 5 to 6 carbon atoms and said ring having alkyl substituents consisting of a total of up to 4 carbon atoms, and $R_3$ and $R_4$ taken collectively with the carbon atoms to which they are joined form a member from the group consisting of a saturated carbocyclic ring of 5 to 6 carbon atoms and said ring having alkyl substituents consisting of a total of up to 4 carbon atoms, $R_5$ represents a member from the group consisting of hydrogen, alkyl of 1 to 12 carbon atoms, alkenyl of 3 to 12 carbon atoms, aryl of up to 10 carbon atoms, aralkyl of up to 12 carbon atoms, alkarylalkyl of up to 12 carbon atoms, alkoxyalkyl of 3 to 12 carbon atoms, hydroxyalkyl of up to 12 carbon atoms, and alkylaminoalkyl of 3 to 18 carbon atoms, Q contains a total of up to about 18 carbon atoms and is a member from the group consisting of

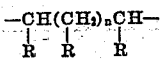 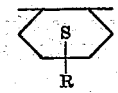

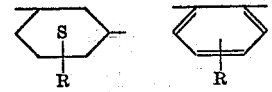

and

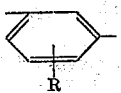

in which $n$ is a number from zero to one and R is a member of the group consisting of hydrogen and alkyl, and A is a chalcogen having an atomic weight of 16 to 32, which comprises bringing together and thereby causing to react at a temperature range of 20° to 75° C., the compounds having the formulas

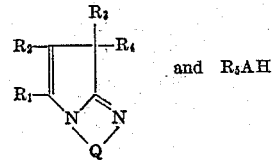

and $R_5AH$

18. A method according to claim 17 in which the temperature range is about 20° to 60° C.

19. A method according to claim 17 in which the reaction is conducted in the presence of an inert volatile organic solvent.

20. A method according to claim 17 in which the reaction is conducted in the presence of an acid catalyst.

No references cited.